(No Model.)
F. W. CROSS.
PIPE PACKING.
No. 463,890. Patented Nov. 24, 1891.
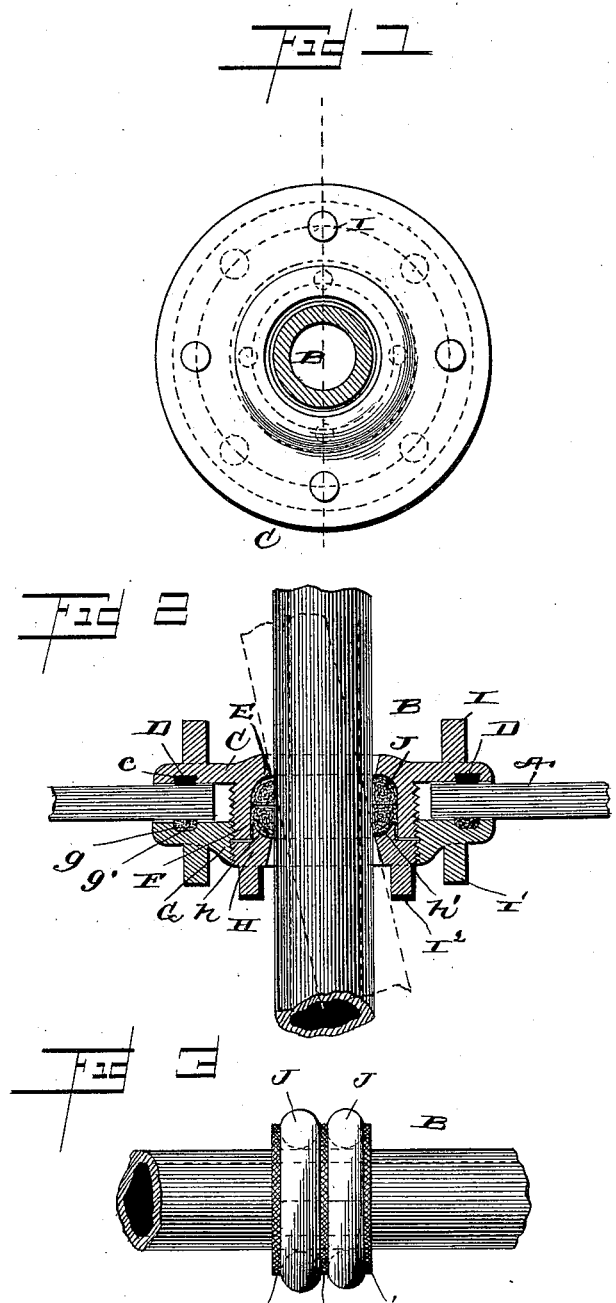
Witnesses
Inventor
Frank W. Cross
By his Attorney
Franck D. Johns

UNITED STATES PATENT OFFICE.

FRANK W. CROSS, OF BALTIMORE, MARYLAND, ASSIGNOR OF ONE-HALF TO THOMAS C. BASSHOR & CO., OF SAME PLACE.

PIPE-PACKING.

SPECIFICATION forming part of Letters Patent No. 463,890, dated November 24, 1891.

Application filed August 13, 1891. Serial No. 402,526. (No model.)

*To all whom it may concern:*

Be it known that I, FRANK W. CROSS, a citizen of the United States, residing at Baltimore, in the county of Baltimore and State of Maryland, have invented certain new and useful Improvements in Pipe-Packings; and I do hereby declare the following to be a full, clear, and exact description of the invention, such as will enable others skilled in the art to which it appertains to make and use the same.

My invention relates to certain new and useful improvements in packings for steam, air, and water pipes, and the means employed for applying the same. Said packing is especially designed for use upon shipboard, particularly upon iron and steel vessels at the points where the numerous steam, air, and water pipes employed pass through the bulk-heads of said vessels.

The objects of my invention are to render the bulk-heads at the points through which the pipes pass perfectly water-tight, to dispense with the old and well-known form of flanges and bolts heretofore used, to obviate the necessity of cutting the pipes in short sections or of bending the same, and to enable the packing to be renewed when the pipes are under pressure.

With these objects in view my improved packing consists in the novel construction, arrangement, and combination of parts hereinafter fully described and claimed, reference being had to the accompanying drawings, forming a part of this specification, in which—

Figure 1 is a plan view of the annulus forming a part of the stuffing-box, the pipe passing through the same being shown in section. Fig. 2 is a central section of the same, taken on the line $xx$ of Fig. 1, the pipe being shown in elevation, dotted lines indicating the position of said pipe when passing through the stuffing-box at an angle thereto. Fig. 3 is a detail showing a short section of pipe and illustrating the manner in which the packing is arranged thereon.

Referring to said drawings, the letter A indicates the bulk-head of a vessel, and B a steam, water, or air pipe passing therethrough. In order to render the bulk-heads of the vessel perfectly water and air tight it is necessary that the pipes passing therethrough should be packed, and I will now proceed to describe my improved packing by means of which the pipes may be passed through the bulk-heads either at an angle thereto or otherwise, and by the employment of which it is unnecessary to cut the pipes up into short lengths or bend the same, and rendering it unnecessary to cast or otherwise form a flange upon the pipe and dispensing with the use of bolts and similar fastenings, yet permitting the packing to be at any time renewed or repaired and without the necessity of shutting off the steam, water, or air.

As shown in said drawings, I construct the opening in the bulk-head A of a size somewhat larger than the diameter of the pipe intended to be passed therethrough, and within said opening is secured a stuffing-box adapted to embrace both sides of the bulk-head and tightly compress or bind the packing about the pipe. Said stuffing-box is constructed as follows:

C indicates an annulus provided upon its interior face with an annular groove $c$, preferably dovetailed, within which is placed a rubber packing-ring D, and which is adapted to lie against one side of the bulk-head. Said annulus is provided with a lip E and an annular flange F, arranged at a right angle to the annulus, the lip E being curved upon its interior to present substantially the quadrant of a circle. The exterior of the flange F is screw-threaded, as shown, and for the purpose hereinafter made apparent.

G indicates an annular nut screw-threaded upon its interior and adapted to engage the screw-threaded flange F, and when screwed up tightly thereon closely embraces the bulk-head A.

H indicates an annular packing-gland screw-threaded upon its exterior and engaging the screw-threaded interior of the nut G and provided with an inwardly-projecting flange $h$, the inner face $h'$ of which is curved substantially upon the arc of a circle, said flange $h$ fitting within the flange F on the annulus C.

The annulus C, nut G, and gland H are each provided with lugs I I' I$^2$, by means of which they are engaged by a spanner or wrench to adjust them, and the interior of both the lip E and gland H are beveled, as shown, whereby the pipe may be passed through the bulkhead at varying or different angles.

J indicates the packing, consisting of two packing-rings of any suitable material arranged to break joints, as shown in Fig. 3, having interposed between said rings and on the outer sides thereof rings of lamp-wick and red lead $j$. Said packing lies within the groove formed by the curved lip E and flange $h$, and when the nut G is screwed up tightly in place said packing-ring will be firmly compressed about the pipe B, making a perfectly water-tight joint. The interior face of the nut G is provided with a groove $g$, which is adapted to hold a packing of lamp-wick and lead or other suitable material $g$, and when the annulus C and nut G are screwed together to tightly embrace the bulk-head on opposite sides said packing $g$ and the packing-ring D serve to insure a water-tight joint between the stuffing-box and the bulk-head.

When the packing wears, it is only necessary to unscrew the gland and replace said packing.

It will be seen that no joints are formed in the pipe at the point where it passes through the bulk-head, but that said pipe is continuous; further, that said pipe may pass through the stuffing-box at an angle to the bulk-head, thus avoiding the necessity of bending the same when it is desired to deflect the pipe.

My improved stuffing-box and packing may be used when the rods of valves or locks pass through decks, and may also be used where electric-light wires or other wires pass through bulk-heads or decks.

While my invention is especially designed to be used upon vessels, it is obvious that it may be used for a great variety of other purposes.

Having thus described my invention, what I claim is—

1. In a packing of the class described, the combination of an annulus provided with a lip and an exteriorly-screw-threaded flange, an interiorly-screw-threaded nut engaging said screw-threaded flange, said annulus and nut being adapted to engage opposite sides of a bulk-head, as shown, an exteriorly-screw-threaded gland engaging with the screw-threaded nut and provided with an inwardly-projecting flange, and a packing-ring interposed between the lip of the annulus and flange of the gland, substantially as shown and described.

2. In a packing of the class described, the combination of an annulus provided with a lip and a screw-threaded flange, a nut engaging said screw-threaded flange, said annulus and nut being adapted to engage the opposite sides of a bulk-head, as shown, a screw-threaded gland engaging the said nut, the inner faces of said lip and gland being oppositely beveled, and a packing-ring interposed between the lip and gland, substantially as described, and for the purpose specified.

3. In a packing of the class described, the combination of an annulus provided with a curved lip and a screw-threaded flange, a nut engaging said screw-threaded flange, said annulus and nut being adapted to engage the opposite sides of a bulk-head, as shown, a screw-threaded gland engaging said nut and provided with an inwardly-projecting flange having a curved face, and a packing-ring interposed between the said lip and gland, substantially as described.

4. The combination of the annulus C, provided with a curved lip E and screw-threaded flange F, and having a packing-ring D, seated in a groove $c$, the nut engaging the screw-threaded flange F, and having a packing seated in a groove $g$, said annulus and nut being adapted to engage the opposite sides of a bulk-head, as shown, the screw-threaded gland H engaging said nut and provided with an inwardly-projecting flange $h$, having a curved face $h'$, and a packing-ring J, interposed between the lip E and gland H, substantially as described.

5. The combination of the annulus C, provided with the lip E and screw-threaded flange F, and having the lugs I, the nut G, having lugs I', the gland H, having lugs I², and the packing-ring J, all constructed and arranged substantially as shown, and for the purpose specified.

In testimony whereof I affix my signature in presence of two witnesses.

FRANK W. CROSS.

Witnesses:
JOSEPH SCHLADT,
WILLIAM H. BERRY.